United States Patent [19]
Roush et al.

[11] Patent Number: 5,423,721
[45] Date of Patent: Jun. 13, 1995

[54] BACON DECOMBER

[75] Inventors: Richard G. Roush, Loveland; James A. Adler, Cincinnati, both of Ohio

[73] Assignee: John Morrell & Co., Cincinnati, Ohio

[21] Appl. No.: 183,729

[22] Filed: Jan. 19, 1994

[51] Int. Cl.6 .................................. A22C 17/00
[52] U.S. Cl. .................... 452/193; 452/198; 254/18
[58] Field of Search ............... 452/175, 193, 198; 254/18, 25, 28, 93 H

[56] References Cited

U.S. PATENT DOCUMENTS 3,376,626  4/1968  Anderson .................... 452/175

FOREIGN PATENT DOCUMENTS 4331079  11/1992  Japan ........................ 254/18

*Primary Examiner*—Willis Little

[57] ABSTRACT

A bacon decomber suspended above a work table for pulling and separating a bacon comb from a bacon belly, including a belly hold-down member for engaging a belly, a pneumatically driven carriage having tines for positioning between a belly and a comb, and a hand-operated trigger plate for selectively activating the carriage.

19 Claims, 2 Drawing Sheets

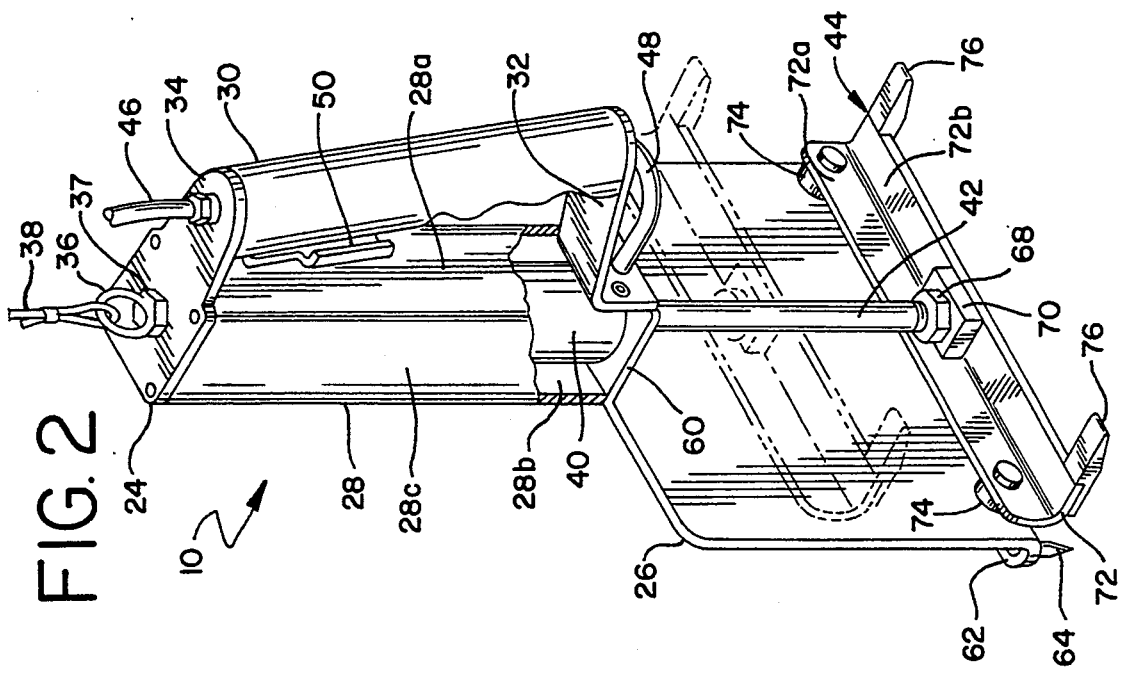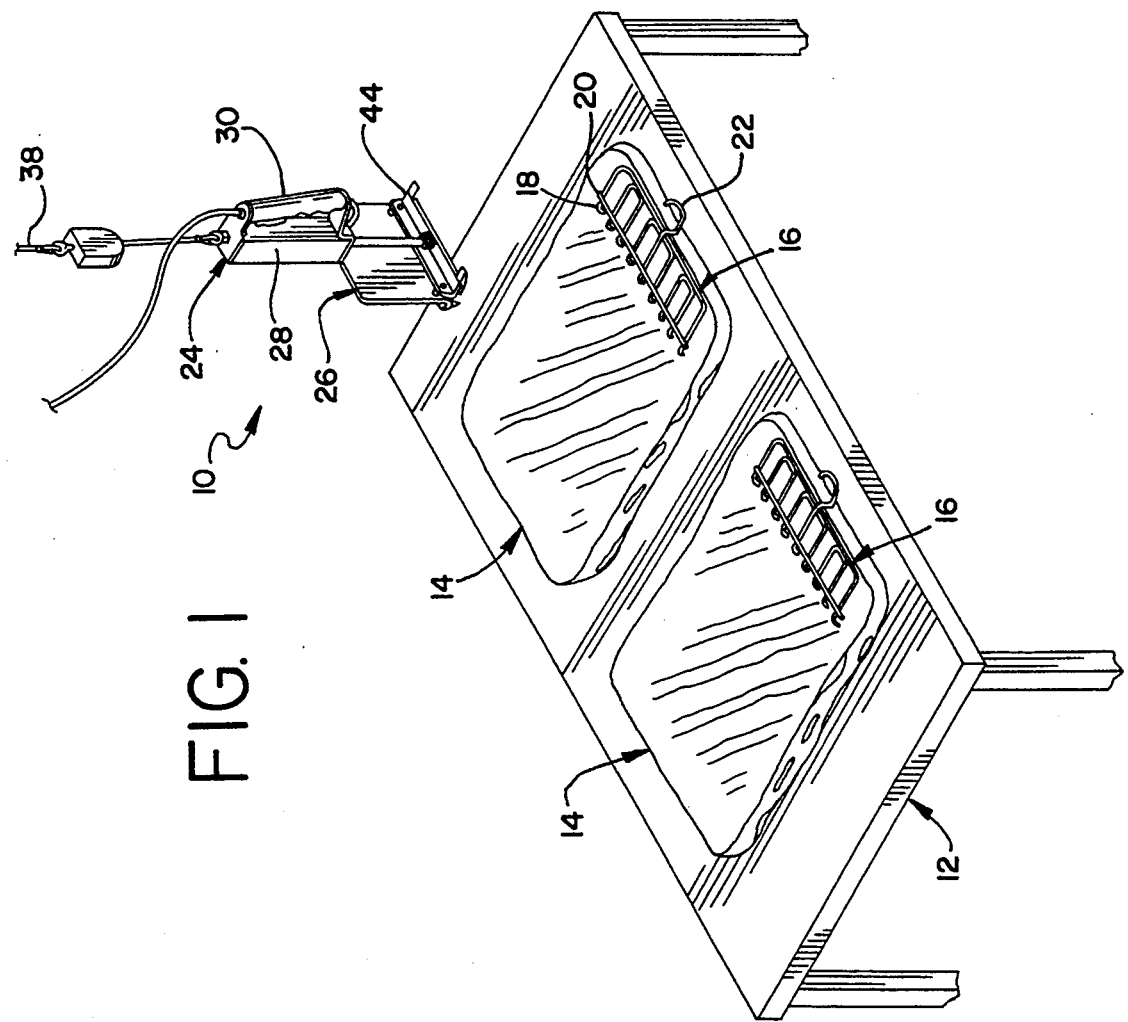

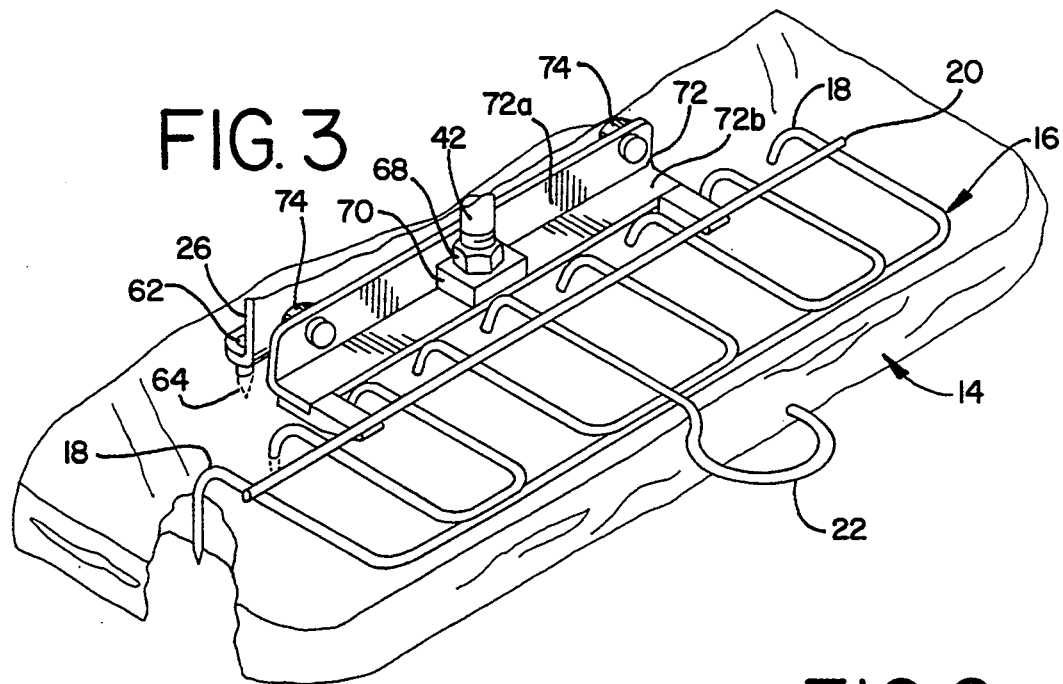
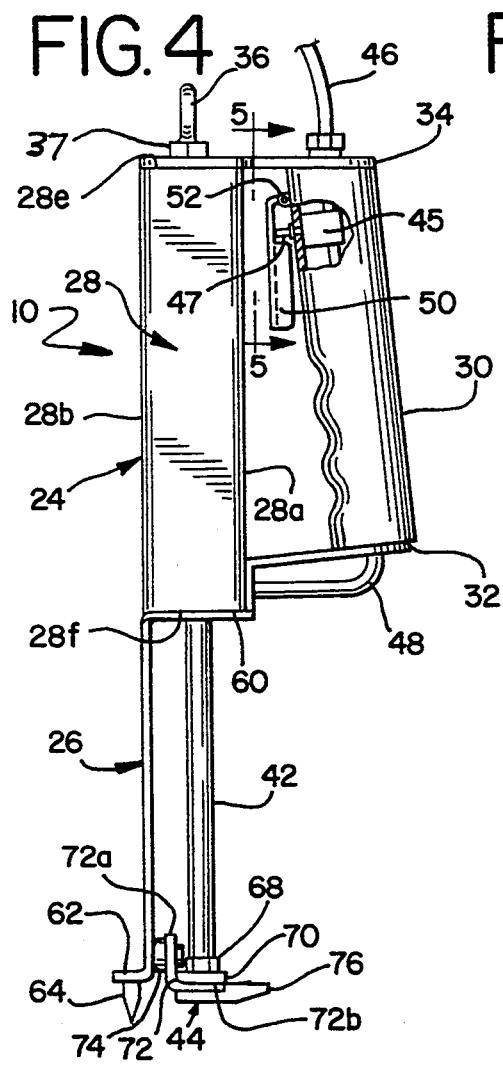
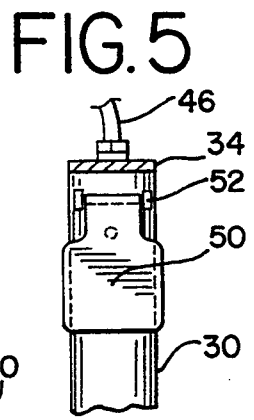
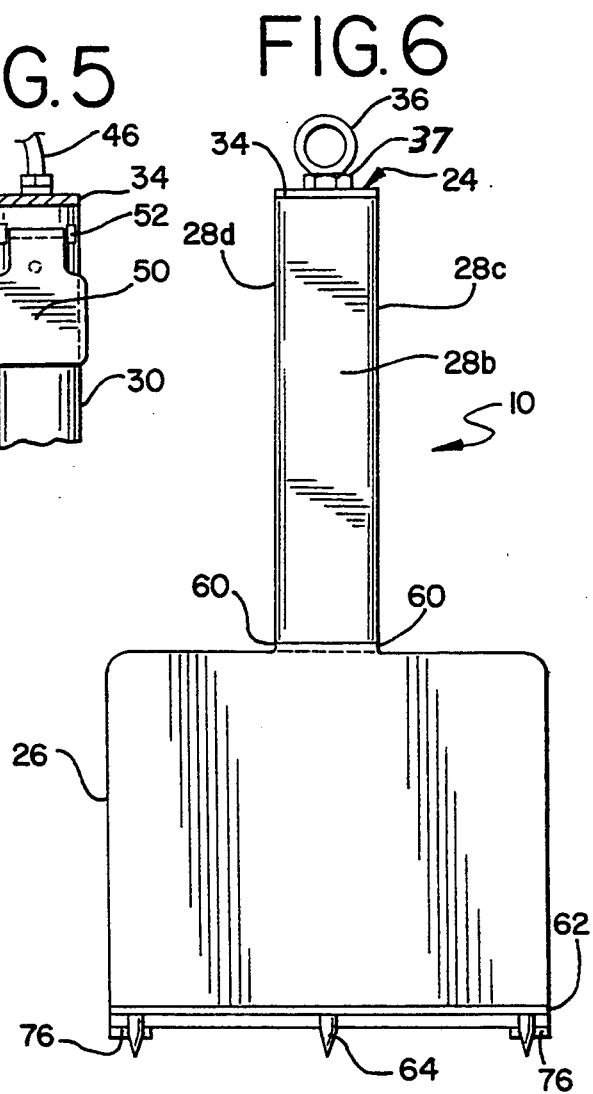

BACON DECOMBER

DESCRIPTION

This invention relates in general to a bacon decomder, and more particularly to a bacon decomber or comb puller for pulling and separating a bacon comb from a bacon belly.

BACKGROUND OF THE INVENTION

Heretofore, it has been well known that in processing bacon bellies, bacon combs or hangers are mounted on the bellies to hang the bellies for smoking or for transportation on overhead tracks systems. After smoking or transporting the bellies, the combs must be removed before further processing. Heretofore, these combs have generally been removed by hand or by using hand tools. Hand-removal of the combs from the bellies is disadvantageous because it is a time-consuming, inaccurate, and potentially dangerous operation. For example, hand-removal of the combs may lead to hand tendon injuries, finger injuries from fat lodged under the operator's fingernails, and other physical injuries to the operator.

Additionally, during hand-removal of the combs, the teeth of the combs tend to break off in the bellies if the combs are not squarely pulled from the bellies by the operator. When this occurs, additional time must be spent to remove the teeth. The broken combs must be discarded, thereby increasing the bacon belly processing costs.

Accordingly there is a need for an automatic bacon comb puller which quickly and easily removes the bacon combs from the bellies without breaking the teeth of the combs while reducing the likelihood of physical injuries to the operator.

SUMMARY OF THE INVENTION

The present invention overcomes the above problems in providing a bacon decomber for pulling and separating a bacon comb from a bacon belly. The bacon decomber of the present invention is suspended over a bacon belly having a bacon comb mounted thereon. The bacon decomber generally includes a handle assembly and a bacon hold-down plate attached to the bottom of the handle assembly for engaging the bacon belly. The handle assembly includes a handle attached to a housing member which has a pneumatic cylinder disposed therein. The cylinder includes a cylinder shaft extending from the bottom of the cylinder and from the housing member. The shaft is attached to a lift finger carriage. The lift finger carriage is adapted to engage the comb mounted in the belly. The pneumatic cylinder is selectively activated by a trigger plate pivotally mounted on the handle. When the operator pulls the trigger plate, the cylinder retracts the shaft causing the lift finger carriage to move upwardly toward the housing member along the hold-down plate. When the trigger plate is released, the shaft and the lift finger carriage return to the extended position.

To remove a bacon comb from a bacon belly, the operator positions the decomber on the belly such that the lift finger carriage engages the comb and the bacon hold-down plate engages the belly. The operator activates the cylinder causing the cylinder shaft to retract into the cylinder. This draws the lift finger carriage upwardly toward the housing pulling the comb and specifically the teeth from the belly while the belly is held down by the hold-down plate. The decomber pulls the comb squarely out of the belly and separates it from the belly. After the comb is separated from the belly, the trigger plate is released causing the shaft to return to the extended position.

It is therefore an object of the present invention to provide a bacon decomber for pulling and separating a bacon comb from a bacon belly.

Another object of the present invention is to provide a bacon decomber for pulling a bacon comb squarely from a bacon belly without breaking the teeth of the comb in the belly.

A further object of the present invention is to provide a bacon decomber for pulling a bacon comb from a bacon belly while reducing the likelihood of hand, finger, and other physical injuries to the operator.

Other objects, features and advantages of the invention will be apparent from the following detailed disclosure, taken in conjunction with the accompanying sheet of drawings, wherein like reference numerals refer to like parts.

DESCRIPTION OF THE DRAWINGS

FIG. 1 is a perspective view of the bacon decomber of the present invention suspended over a work area having two bacon bellies with bacon combs mounted thereon;

FIG. 2 is an enlarged perspective view of the bacon decomber of the present invention and illustrating the lift finger carriage in the up or stroked position in phantom;

FIG. 3 is an enlarged fragmentary perspective view of the bacon decomber and specifically the lift finger carriage engaging the bacon comb mounted on a bacon belly shown in fragmentary;

FIG. 4 is a side elevation view of the bacon decomber;

FIG. 5 is a fragmentary elevation view of the handle and trigger of the bacon decomber taken substantially along line 5—5 of FIG. 4; and FIG. 6 is a rear elevation view of the bacon decomber.

DESCRIPTION OF THE INVENTION

Referring now to the drawings, and particularly to FIG. 1, the bacon decomber or the bacon comb puller of the present invention, generally indicated by numeral 10, is illustrated in suspended position over a work table or area 12. The bacon decomber 10 is preferably suspended from a light duty counter balance (not shown) over the work table 12. Two bacon bellies or slabs 14, each having a bacon comb or hanger 16 mounted thereon, are positioned on the work table 12. As more clearly shown in FIG. 3, one end of each comb includes a series of spaced apart elongated teeth 18 inserted on one side of belly 14 and extending from the opposite side of belly 14. The teeth 18 are suitably connected together. At least one cross bar 20 connected to the teeth extends across the length of the comb 16. The comb 16 includes a hook 22 for hanging the belly extending from the end opposite the teeth 18.

The bacon decomber 10 generally includes a handle assembly 24 and a bacon hold-down plate 26 attached to the bottom of the handle assembly 24. The handle assembly 24 generally includes a rectangular tubular housing member 28 attached to a handle 30 used by the operator to hold and position the bacon decomber 10.

As further illustrated in FIGS. 2 to 6, the tubular housing member 28 has spaced apart front and back walls 28a and 28b connected by spaced apart side walls 28c and 28d and defining top and bottom open ends 28e and 28f. The handle 30 is attached to housing member 28 by lower and upper handle supporting brackets 32 and 34. The L-shaped lower supporting bracket 32 is suitably secured to the lower portion of the front wall 28a of the housing member 28. The upper supporting bracket 34 is suitably secured to the top end 28e of the housing member 28. The handle 30 is securely attached between brackets 32 and 34, and extends farther away from the housing 28 at the lower end to facilitate gripping by the operator. The brackets 32 and 34 maintain the handle along the front wall 28a, but spaced far enough from the front wall 28a to enable the operator's hand to grip the handle 30.

A support ring 36 integrally formed with a hex nut 37 is suitably attached to the upper bracket 34. A conventional suspension wire 38 is connected at one end to the support ring 36 and at the other to a light duty counter balance (not shown). This enables the entire decomber 10 to be adjustably and movably suspended above the work area 12.

A pneumatic cylinder 40 is centrally disposed in the tubular housing 28. The cylinder 40 is secured to the upper bracket 34, preferably by hex nut 37 in a conventional manner. The cylinder 40 includes a cylinder shaft or rod 42, and a piston (not shown) connected to the rod and movable in the cylinder. The shaft extends from the lower end of the cylinder 40, and is suitably secured to a lift finger carriage 44, as further described below. The pneumatic cylinder 40 is selectively activated by a pneumatic valve 45 mounted within the handle 30. More specifically, the pneumatic system includes pneumatic supply line 46 connected to a suitable source of compressed air. The line extends through the upper support bracket 34 and is connected to the inlet of the pneumatic valve 45. A second pneumatic line 48 is connected to the outlet of the valve 44, and extends through the lower support bracket 32 at the lower end of the handle and through the front wall 28a of the housing where it is connected to the cylinder 40. The valve 45 includes a plunger 47 that may be depressed to open the valve by squeezing a trigger plate 50 that is pivotally mounted to the handle by hinge 52, as best shown in FIGS. 4 and 5. In operation, when the trigger plate is depressed, compressed air will flow from the supply line 46 through valve 45, and to the cylinder 40 through line 48. The cylinder 40 thereby retracts the shaft 42 when the trigger plate 50 is depressed. When the trigger plate 50 is released, the plunger 47 is spring-biased to closed position and the shaft 42 returns to the extended position. It should be appreciated that the decomber requires approximately eighty to one hundred pounds per square inch of dry air supply. It should also be appreciated that other shaft driving mechanisms could be used in combination with the bacon decomber of the present invention.

The bacon hold-down plate 26 is attached to the bottom end 28f of the housing member 28. More specifically, the bacon hold-down plate 26 is a rectangular plate having a smaller rectangular attachment plate 60 integrally connected to it and extending at a substantially perpendicular angle. The attachment plate 60 is suitably secured to the bottom end 28f of the housing member 28 such that the hold-down plate 26 extends below and in a plane substantially parallel to the housing member 28. It should be appreciated that the attachment plate 60 includes a slot or opening (not shown) through which the cylinder shaft 42 extends and that the cylinder 40 is secured in the housing 28 against the attachment plate 60. A flange or lip 62 is integrally formed along the entire length of the lower end of the hold-down plate 26 opposite the attachment plate 60. The flange extends at a perpendicular angle to the hold-down plate 26 and in the opposite direction as the attachment plate 60. Three spaced-apart spikes 64 are suitably attached to and extend downwardly from the lip 62. The lip 62 and the spikes 64 are adapted to engage the bacon belly 14 and hold it down on the work table 12 while the lift finger carriage 44, connected to the shaft 42, pulls out and separates the bacon comb from the bacon belly.

The end of the cylinder shaft 42 is threadedly received in a block 70 centrally mounted on to the lift finger carriage 44 and locked in position by a hex nut 68. The mounting block 70 is suitably secured to an L-shaped carriage bracket 72 having a vertical member 72a connected to a horizontal member 72b. The vertical member 72a is disposed parallel to the bacon hold-down member 26. A pair of plastic guides 74, preferably made of a suitable plastic, such as Delrin resin, are suitably connected to vertical member 72a to facilitate the sliding and guiding of the carriage 44 relative to the hold-down plate 26. Delrin is a trademark owned by DuPont for a linear polyoxymethylene-type acetal resin. The guides 74 thereby reduce friction between the lift finger carriage 44 and the hold-down plate 26. A pair of spaced apart fingers or tines 76 are suitably connected to the horizontal member 72b of the carriage bracket 72 and extend in a direction opposite the flange 62 of the hold-down plate. The fingers 76 are spaced apart to enter between the teeth 18 of the comb 6 and to engage between the cross bar 20 and the bacon belly, as illustrated in FIG. 3.

To remove the bacon comb 16 from the bacon belly 14, the operator positions the decomber on the belly as shown in FIG. 3. The spikes 64 are driven into the belly, and the lip 62 of the hold-down plate 26 engages the belly preventing the upward movement of the belly. The fingers 76 of the lift finger carriage are positioned between the teeth 18 and under the crossbar 18 as the spikes are driven into the belly. The operator depresses the trigger plate 50 causing the cylinder shaft 42 to retract toward the housing member and into the cylinder 40. This draws the lift finger carriage 44 upwardly sliding along the hold-down plate 26. The fingers 76 engage and pull the crossbar upwardly while the belly is held down by the hold-down plate 26. This action pulls the teeth 18 uniformly from the belly while the belly is held down by the hold-down plate 26. The retracted position of the lift finger carriage is shown in phantom in FIG. 2. The decomber 10 pulls the comb 16 squarely out of the belly 14 and separates it from the belly reducing the number of broken teeth on the combs. The decomber also reduces the likelihood of injury to the operator. After the comb is separated from the belly and removed from the lift finger carriage, the trigger plate is released causing the shaft to return to the extended position. The comb may be disengaged from the decomber and stored for further use.

It will be understood that modifications and variations may be effected without departing from the scope of the novel concepts of the present invention, but it is understood that this application is to be limited only by the scope of the appended claims.

The invention is hereby claimed as follows:

1. A bacon comb puller for pulling and separating a bacon comb from a bacon belly, which comprises:
   a handle assembly;
   a bacon hold-down means extending from said handle assembly and adapted to grippingly engage and hold said belly when separating a comb from a belly;
   a comb engaging means carried by said handle assembly engageable with said comb and movable relative to said hold-down means and for pulling and separating said comb from said bacon belly;
   means on said handle assembly for driving said comb engaging means, and
   means on said handle assembly for selectively operating said comb driving means and accordingly said comb engaging means to apply a pulling force between said belly and said comb.

2. The bacon comb puller of claim 1, wherein said handle assembly includes a means for housing said driving means.

3. The bacon comb puller of claim 2, wherein said handle assembly further includes a handle attached to said housing means.

4. The bacon comb puller of claim 3, wherein said bacon hold-down means is fixedly connected to said housing means.

5. The bacon comb puller of claim 1, wherein said bacon hold-down means includes a bacon hold-down plate, a flange means attached to said plate for engaging said belly, and gripping means disposed on said flange for gripping said belly.

6. The bacon comb puller of claim 5, wherein said gripping means include a plurality of spikes.

7. The bacon comb puller of claim 1, wherein said driving means includes a cylinder disposed in said handle assembly and a retractable shaft extending from said cylinder in substantially the same direction as said bacon hold-down means.

8. The bacon comb puller of claim 7, wherein said comb engaging means includes a lift finger carriage attached to said shaft, said lift finger carriage having means for engaging said comb.

9. The bacon comb puller of claim 8, wherein said means for engaging said comb includes a plurality of fingers or tines extending from said lift finger carriage which are adapted to engage a crossbar on said comb.

10. The bacon comb puller of claim 1, wherein said means for selectively operating said comb driving means includes trigger means adapted to activate a valve means connected to said driving means.

11. The bacon comb puller of claim 1, wherein said driving means includes a pneumatic cylinder.

12. The bacon comb puller of claim 1, wherein the bacon decomber is adapted to be movably suspended over a work area on which bacon bellies with combs are received.

13. A bacon comb puller for pulling and separating a bacon comb from a bacon belly, which comprises:
    a housing member;
    a bacon belly hold-down plate attached to said housing member and having gripping means for engaging said bacon belly;
    a handle attached to said housing member;
    a shaft extending from said housing member substantially parallel to said bacon hold-down member;
    a driving means disposed in said housing member for retracting said shaft into said housing member;
    a trigger and valve means for activating said driving means; and
    a lift finger carriage attached to said shaft and adapted to engage said bacon comb,
    whereby selective activation of said trigger and valve means retracts said shaft into said housing member causing said lift finger carriage to pull said bacon comb from said belly as said hold-down plate prevents the movement of the belly toward said housing member.

14. The bacon comb puller of claim 13, wherein a plurality of fingers are attached to said lift finger carriage, said fingers adapted to engage a crossbar on said bacon comb.

15. The bacon comb puller of claim 13, wherein the bacon decomber is suspended over a work area.

16. The bacon comb puller of claim 13, wherein the bacon belly gripping means includes at least one spike for engaging said belly.

17. The bacon comb puller of claim 14, wherein the fingers are substantially spaced apart.

18. The bacon comb puller of claim 9, wherein the fingers or tines are substantially spaced apart.

19. A bacon comb puller for pulling and separating a bacon comb from a bacon belly, which comprises:
    a handle assembly having means for attachment to a suspension wire;
    a bacon hold-down means extending from said handle assembly and adapted to grippingly engage and hold said belly when separating a comb from a belly;
    a comb engaging means carried by said handle assembly engageable with said comb and movable relative to said hold-down means and for pulling and separating said comb from said bacon belly;
    means on said handle assembly for driving said comb engaging means, and
    means on said handle assembly for selectively operating said comb driving means and accordingly said comb engaging means to apply a pulling force between said belly and said comb.

* * * * *